US012654520B2

(12) United States Patent
Nojiri et al.

(10) Patent No.: US 12,654,520 B2
(45) Date of Patent: Jun. 16, 2026

(54) GLASS RUN

(71) Applicant: TOYODA GOSEI CO., LTD., Kiyosu (JP)

(72) Inventors: Masatoshi Nojiri, Kiyosu (JP); Yasuhiro Shimizu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 218 days.

(21) Appl. No.: 18/155,907

(22) Filed: Jan. 18, 2023

(65) Prior Publication Data

US 2023/0226891 A1     Jul. 20, 2023

(30) Foreign Application Priority Data

Jan. 20, 2022     (JP) ................................. 2022-007095

(51) Int. Cl.
*B60J 5/04*          (2006.01)
*B60J 10/18*         (2016.01)
(Continued)

(52) U.S. Cl.
CPC ............. *B60J 5/0402* (2013.01); *B60J 10/18* (2016.02); *B60J 10/76* (2016.02); *B60J 10/50* (2016.02)

(58) Field of Classification Search
CPC . B60J 5/0402; B60J 10/76; B60J 10/18; B60J 10/16; B60J 10/50
See application file for complete search history.

(56) References Cited

U.S. PATENT DOCUMENTS 5,343,609 A * 9/1994 McManus ................ B60J 10/15
                                                        264/177.17
6,964,799 B1 * 11/2005 Mizuno .................... B60J 10/00
                                                        428/35.8

(Continued)

FOREIGN PATENT DOCUMENTS

JP          H05-074924 U      10/1993
JP          H07-069075 A       3/1995
(Continued)

OTHER PUBLICATIONS

Office Action dated Aug. 20, 2024 issued for the corresponding Japanese Patent Application No. 2022-007095 (and English translation).

(Continued)

*Primary Examiner* — Jason S Morrow
(74) *Attorney, Agent, or Firm* — Posz Law Group, PLC

(57)          ABSTRACT

A glass run includes: a bottom wall; a vehicle-outer-side side wall; and a vehicle-inner-side side wall. The bottom wall, the vehicle-outer-side side wall and the vehicle-inner-side side wall configure a basic framework being attached to a door frame groove portion formed in a door frame. The glass run guides an up and down movement of a door glass. A thick portion that protrudes to a vehicle inner side, is in sliding contact with the door glass, and has a higher hardness than that of the vehicle-outer-side side wall is formed on a vehicle inner side of the vehicle-outer-side side wall. When a thickness of the thick portion is set to t1 and a sum of thicknesses of the thick portion and the vehicle-outer-side side wall is set to T, t1 is 0.4T or more and 1.0T or less.

8 Claims, 7 Drawing Sheets

(51) Int. Cl.
_B60J 10/76_ (2016.01)
_B60J 10/50_ (2016.01)

(56) References Cited

U.S. PATENT DOCUMENTS

| | | | | |
|---|---|---|---|---|
| 8,661,736 | B2 * | 3/2014 | Roll | B60J 10/76 |
| | | | | 49/440 |
| 9,475,374 | B2 * | 10/2016 | Murree | B29D 99/0053 |
| 9,493,061 | B2 * | 11/2016 | Goto | B60J 10/76 |
| 10,112,468 | B2 * | 10/2018 | Miyata | B60J 10/16 |
| 10,150,356 | B2 * | 12/2018 | Takahashi | B60J 10/88 |
| 10,220,692 | B2 * | 3/2019 | Mori | B60J 10/88 |
| 10,589,609 | B2 * | 3/2020 | Schaefer | B60J 10/32 |
| 10,661,644 | B1 | 5/2020 | Larsen | |
| 10,752,184 | B2 * | 8/2020 | Husek | B60J 10/70 |
| 11,117,454 | B2 * | 9/2021 | Zia | B60J 10/70 |
| 11,479,645 | B2 * | 10/2022 | Goto | C08L 23/00 |
| 12,128,744 | B2 * | 10/2024 | Nojiri | B60J 10/16 |
| 2005/0003158 | A1 * | 1/2005 | Yamasa | B60J 10/17 |
| | | | | 264/177.1 |
| 2005/0095397 | A1 * | 5/2005 | Omori | B60J 10/74 |
| | | | | 428/122 |
| 2005/0126077 | A1 * | 6/2005 | Cittadini | B60J 10/38 |
| | | | | 49/377 |
| 2005/0198906 | A1 * | 9/2005 | Fujita | B60J 10/24 |
| | | | | 49/428 |
| 2006/0141208 | A1 | 6/2006 | Takase et al. | |
| 2009/0064592 | A1 | 3/2009 | Takase et al. | |
| 2009/0071077 | A1 * | 3/2009 | Takase | B60J 10/277 |
| | | | | 49/489.1 |
| 2010/0253013 | A1 * | 10/2010 | Mills | B29C 48/12 |
| | | | | 277/647 |
| 2015/0273990 | A1 * | 10/2015 | Adachi | B60J 10/88 |
| | | | | 49/459 |
| 2023/0065367 | A1 | 3/2023 | Nojiri et al. | |
| 2023/0226891 | A1 | 7/2023 | Nojiri et al. | |
| 2025/0091418 | A1 * | 3/2025 | Nagai | B60J 5/0402 |

FOREIGN PATENT DOCUMENTS

| | | |
|---|---|---|
| JP | H08-230485 A | 9/1996 |
| JP | H09-052523 A | 2/1997 |
| JP | H10-000942 A | 1/1998 |
| JP | 2001-277858 A | 10/2001 |
| JP | 2005-119530 A | 5/2005 |
| JP | 2009-056941 A | 3/2009 |
| JP | 2010-005808 A | 1/2010 |
| JP | 2012-148696 A | 8/2012 |
| JP | 2023-034615 A | 3/2023 |

OTHER PUBLICATIONS

Office Action dated Jun. 10, 2025 issued in the corresponding Chinese Patent Application No. 202310060610.X (and English translation).

Office Action dated Nov. 6, 2025 issued in the corresponding Japanese Patent Application No. 2024-177696 (and English translation).

* cited by examiner

VEHICLE OUTER SIDE

VEHICLE INNER SIDE

VEHICLE OUTER SIDE

VEHICLE INNER SIDE

FIG.8

GLASS RUN

CROSS-REFERENCE TO RELATED APPLICATION(S)

This application is based upon and claims the benefit of priority from prior Japanese patent application No. 2022-007095 filed on Jan. 20, 2022, the entire contents of which are incorporated herein by reference.

BACKGROUND

1. Field of the Invention

The present disclosure relates to a glass run attached to a door frame formed on a door of a vehicle such as an automobile.

2. Description of the Related Art

Improving quietness of a vehicle such as an automobile increases comfort of a passenger, so a degree of appeal for improving product competitiveness is high. Also, in an electric vehicle, which is expected to spread rapidly in the future, an engine that was conventionally installed disappears, so main noise that remains after an engine sound disappears is road noise and wind noise. Therefore, a need for techniques to reduce them has increased more than ever before.

The wind noise is a sound that is generated outside a passenger compartment when wind hits a vehicle while the vehicle is traveling, and reaches the passenger compartment through a vehicle body. It is known that a door glass near passenger's ears in the passenger compartment has the largest contribution to a permeation path, so countermeasures such as increasing a thickness of the door glass and setting an acoustic glass are being taken. However, an increase in weight and cost are obstacles.

In addition to the door glass, the glass run, which is a sealing material between the door glass and a door frame, can also reduce noise, especially in a high frequency range of 1 kHz or higher, and studies are being conducted to increase this reduction effect.

As a technique to reduce noise caused by wind noise, it has been focused on reducing vibration by utilizing so-called impedance matching, in which a vibration energy of the door glass is efficiently dissipated by making it flow through parts in contact with the door glass, and Japanese Patent Application No. 2021-140940 realizes the noise reduction.

The technique of Japanese Patent Application No. 2021-140940 will be described with reference to FIG. 8. A glass run 10 has a basic framework of a bottom wall 20, a vehicle-outer-side side wall 30, and a vehicle-inner-side side wall 40, and is formed in a channel shape (having a substantially U-shaped cross section).

A thick portion 31 that protrudes to a vehicle inner side, is in sliding contact with a door glass 4, and has a higher hardness than that of the vehicle-outer-side side wall 30 is formed on a vehicle inner side of the vehicle-outer-side side wall 30. In addition, a plurality of ribs 32 having convex shapes are formed continuously in parallel in a longitudinal direction on a vehicle-inner-side surface of the thick portion 31.

By bringing the door glass 4 into sliding contact with the thick portion 31 formed on the vehicle-outer-side side wall 30 and making the hardness of the thick portion 31 higher than that of the vehicle-outer-side side wall 30, a rigidity difference between the door glass 4 and the thick portion 31 becomes smaller, and impedance matching allows vibration of the door glass 4 to flow efficiently to the thick portion 31 and dissipate. As a result, noise caused by wind noise can be reduced.

In addition, by forming the plurality of ribs 32 having convex shapes continuously in parallel in the longitudinal direction on the vehicle-inner-side surface of the thick portion 31, when the door glass 4 is moved up and down, the thick portion 31 can be prevented from being caught in dust, foreign matter, or the like, and accompanying abnormal noise can be prevented from occurring.

In Japanese Patent Application No. 2021-140940, since the ribs 32 having convex shapes are formed on the vehicle inner side of the thick portion to prevent dust, foreign matter, or the like from getting caught, an abutment between the door glass 4 and the thick portion 31 of the glass run 10 is not surface contact but line contact (point contact in cross section). As a result, an effect of increasing rigidity due to the thick portion was not sufficiently exhibited, and thus an effect of reducing noise caused by wind noise was insufficient.

SUMMARY

According to a first aspect of the present disclosure, there is provided a glass run including: a bottom wall; a vehicle-outer-side side wall; and a vehicle-inner-side side wall, where: the bottom wall, the vehicle-outer-side side wall and the vehicle-inner-side side wall configure a basic framework being attached to a door frame groove portion formed in a door frame; the glass run guides an up and down movement of a door glass; a thick portion that protrudes to a vehicle inner side, is in sliding contact with the door glass, and has a higher hardness than that of the vehicle-outer-side side wall is formed on a vehicle inner side of the vehicle-outer-side side wall; and when a thickness of the thick portion is set to t1 and a sum of thicknesses of the thick portion and the vehicle-outer-side side wall is set to T, t1 is 0.4T or more and 1.0T or less.

In the first aspect, the thick portion that protrudes to the vehicle inner side, is in sliding contact with the door glass, and has the higher hardness than that of the vehicle-outer-side side wall is formed on the vehicle inner side of the vehicle-outer-side side wall, and when the thickness of the thick portion is set to t1 and the sum of the thicknesses of the thick portion and the vehicle-outer-side side wall is set to T, t1 is 0.4T or more and 1.0T or less. Therefore, by forming the thick portion thicker, the rigidity of the glass run can be increased. As a result, even when a rib having a convex shape is formed on the vehicle inner side of the thick portion, an effect of the thick portion is sufficiently exhibited, and thus a reduction effect against noise caused by wind noise can be increased. When t1 is set to be less than 0.4T, the rigidity of the vehicle-outer-side side wall of the glass run including the thick portion is not sufficiently increased, and thus it is difficult to sufficiently exhibit the effect of the thick portion.

In addition, when t1 is set to be less than 1.0T, the thick portion may be formed as a single mass, or may be divided into a portion that is in sliding contact with the door glass and a portion of the thick portion on the vehicle outer side, which is located in the vehicle-outer-side side wall. In the case of dividedly forming the thick portion in the vehicle-outer-side side wall, for example, the case of embedding the divided thick portion in the vehicle-outer-side side wall, the case of forming the divided thick portion so as to be exposed to the vehicle outer side of the vehicle-outer-side side wall, and the case of including both of the cases described above are conceivable.

Here, the "rigidity of the glass run" is expressed by an amount of increase in a reaction force from the glass run with respect to an amount of displacement of a pressed portion when the door glass presses the glass run. Therefore, "increasing the rigidity of the glass run" means increasing a slope (gradient) in a relationship between the displacement and the reaction force.

According to a second aspect of the present disclosure, there is provided a glass run including: a bottom wall; a vehicle-outer-side side wall; and a vehicle-inner-side side wall, where: the bottom wall, the vehicle-outer-side side wall and the vehicle-inner-side side wall configure a basic framework being attached to a door frame groove portion formed in a door frame; the glass run guides an up and down movement of a door glass; a thick portion that protrudes to a vehicle inner side, is in sliding contact with the door glass, and has a higher hardness than that of the vehicle-outer-side side wall is formed on a vehicle inner side of the vehicle-outer-side side wall; and an insert is embedded in a vehicle outer side of the thick portion of the vehicle-outer-side side wall.

In the second aspect, the thick portion that protrudes to the vehicle inner side, is in sliding contact with the door glass, and has the higher hardness than that of the vehicle-outer-side side wall is formed on the vehicle inner side of the vehicle-outer-side side wall of the glass run, and the insert is embedded in the vehicle outer side of the thick portion of the vehicle-outer-side side wall. Therefore, the thick portion and the vehicle-outer-side side wall with the embedded insert can increase the rigidity of the glass run. As a result, even when a rib having a convex shape is formed on the vehicle inner side of the thick portion, an effect of the thick portion is sufficiently exhibited, and thus a reduction effect against noise caused by wind noise can be increased.

According to a third aspect of the present disclosure, in the second aspect, the insert is a metal plate, a wire carrier, or a wire core material.

In the third aspect, the insert is a metal plate, a wire carrier, or a wire core material. Therefore, the insert can be embedded as a thin plate in the vehicle-outer-side side wall by co-extrusion molding when molding the glass run. As a result, the rigidity of the glass run can be increased, an effect of the thick portion is sufficiently exhibited, and thus a reduction effect against noise caused by wind noise can be increased.

Here, the wire carrier is a long thin plate-shaped piece formed by bending a thin wire as a core material in a zigzag pattern at a constant width and holding it with a plurality of threads in a longitudinal direction.

According to a fourth aspect of the present disclosure, there is provided a glass run including: a bottom wall; a vehicle-outer-side side wall; and a vehicle-inner-side side wall, where: the bottom wall, the vehicle-outer-side side wall and the vehicle-inner-side side wall configure a basic framework being attached to a door frame groove portion formed in a door frame; the glass run guides an up and down movement of a door glass; a thick portion that protrudes to a vehicle inner side and is in sliding contact with the door glass is formed on a vehicle inner side of the vehicle-outer-side side wall; and a semi-rigid material portion made of a semi-rigid material is formed in a portion of the vehicle-outer-side side wall that connects with the thick portion, and a hardness of the semi-rigid material portion is less than that of the thick portion and greater than that of the vehicle-outer-side side wall other than the semi-rigid material portion.

In the fourth aspect, the thick portion that protrudes to the vehicle inner side and is in sliding contact with the door glass is formed on the vehicle inner side of the vehicle-outer-side side wall, and the semi-rigid material portion made of a semi-rigid material is formed in a portion of the vehicle-outer-side side wall that connects with the thick portion, and further the hardness of the semi-rigid material portion is less than that of the thick portion and greater than that of the vehicle-outer-side side wall other than the semi-rigid material portion. Therefore, it is possible to increase rigidity of the vehicle-outer-side side wall of a portion where the thick portion is formed. As a result, rigidity of the glass run increases, so even when a rib having a convex shape is formed on the vehicle inner side of the thick portion, an effect of the thick portion is sufficiently exhibited, and thus a reduction effect against noise caused by wind noise can be increased.

The thick portion that protrudes to the vehicle inner side, is in sliding contact with the door glass, and has the higher hardness than that of the vehicle-outer-side side wall is formed on the vehicle inner side of the vehicle-outer-side side wall of the glass run. Further, when the thickness of the thick portion is set to t1 and the sum of the thicknesses of the thick portion and the vehicle-outer-side side wall is set to T, t1 is 0.4T or more and 1.0T or less, and thus by forming the thick portion thicker, the rigidity of the glass run can be increased. As a result, even when the rib having a convex shape is formed on the vehicle inner side of the thick portion, the effect of the thick portion is sufficiently exhibited, and thus the reduction effect against noise caused by wind noise can be increased.

The thick portion that protrudes to the vehicle inner side, is in sliding contact with the door glass, and has the higher hardness than that of the vehicle-outer-side side wall of the vehicle-outer-side side wall is formed on the vehicle inner side of the vehicle-outer-side side wall, and the insert is embedded in the vehicle outer side of the thick portion of the vehicle-outer-side side wall. Therefore, the rigidity of the glass run can be increased by the vehicle-outer-side side wall in which the thick portion and the insert are embedded. As a result, even when the rib having a convex shape is formed on the vehicle inner side of the thick portion, the effect of the thick portion is sufficiently exhibited, and thus the reduction effect against noise caused by wind noise can be increased.

In addition, the thick portion that protrudes to the vehicle inner side and is in sliding contact with the door glass is formed on the vehicle inner side of the vehicle-outer-side side wall, and the semi-rigid material portion made of a semi-rigid material is formed in the portion that connects with the thick portion of the vehicle-outer-side side wall, and further the hardness of the semi-rigid material portion is less than that of the thick portion and greater than that of the vehicle-outer-side side wall other than the semi-rigid material portion. Therefore, it is possible to increase the rigidity of the vehicle-outer-side side wall of the portion where the thick portion is formed. As a result, the rigidity of the glass run increases, so even when the rib having a convex shape is formed on the vehicle inner side of the thick portion, the effect of the thick portion is sufficiently exhibited, and thus the reduction effect against noise caused by wind noise can be increased.

BRIEF DESCRIPTION OF THE DRAWINGS

FIG. 3A is a cross-sectional view corresponding to the line X-X in FIG. 1, and FIG. 3B is a cross-sectional view corresponding to the line Y-Y in FIG. 1.

FIG. 4A is a cross-sectional view corresponding to the line X-X in FIG. 1, and FIG. 4B is a cross-sectional view corresponding to the line Y-Y in FIG. 1.

FIG. 5A is a cross-sectional view corresponding to the line X-X in FIG. 1, and FIG. 5B is a cross-sectional view corresponding to the line Y-Y in FIG. 1.

FIG. 6A is a cross-sectional view corresponding to the line X-X in FIG. 1, and FIG. 6B is a cross-sectional view corresponding to the line Y-Y in FIG. 1.

FIG. 7A is a cross-sectional view corresponding to the line X-X in FIG. 1, and FIG. 7B is a cross-sectional view corresponding to the line Y-Y in FIG. 1.

FIG. 8 illustrates a glass run of the related art, and is a cross-sectional view corresponding to the line X-X in FIG. 1 (Japanese Patent Application No. 2021-140940).

DETAILED DESCRIPTION OF THE INVENTION

Figure 1:
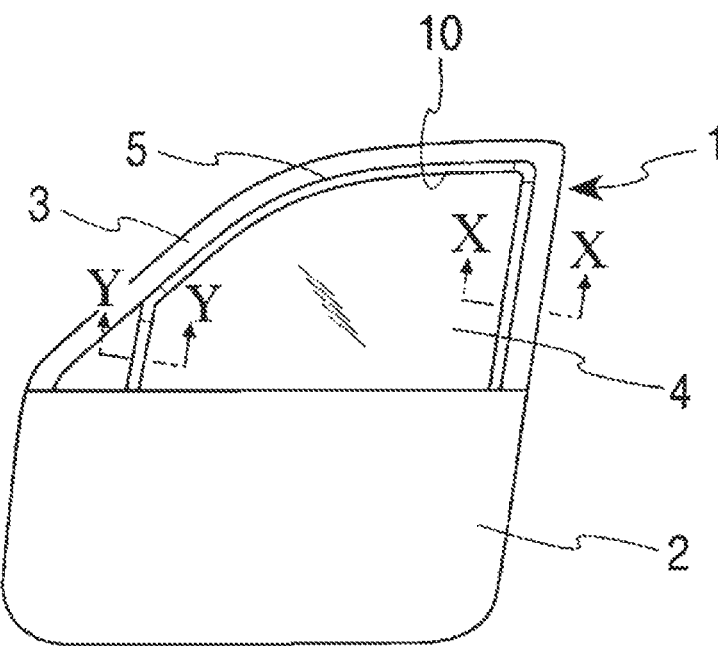
FIG. 1 is a front view of a door for an automobile.

In the following description, the same parts as in the related art are given the same names and the same reference numerals. A first embodiment of the present disclosure will be described with reference to FIGS. 1 to 3B. FIG. 1 illustrates a front view of a front door 1 on a left side of an automobile as seen from a vehicle outer side. A door frame 3 is attached to an upper portion of a door body 2 that forms the front door 1. A window opening is formed by the door frame 3 and an upper edge of the door body 2. A glass run 10 is attached to an inner peripheral edge of the window opening and the inside of the door body 2 to guide up-and-down movement of a door glass 4. The present disclosure can be applied not only to the front door 1 on the left side but also to a front door on a right side and rear doors on left and right sides. Further, it is applicable to a sliding door of which a door glass moves up and down.

Figure 2:
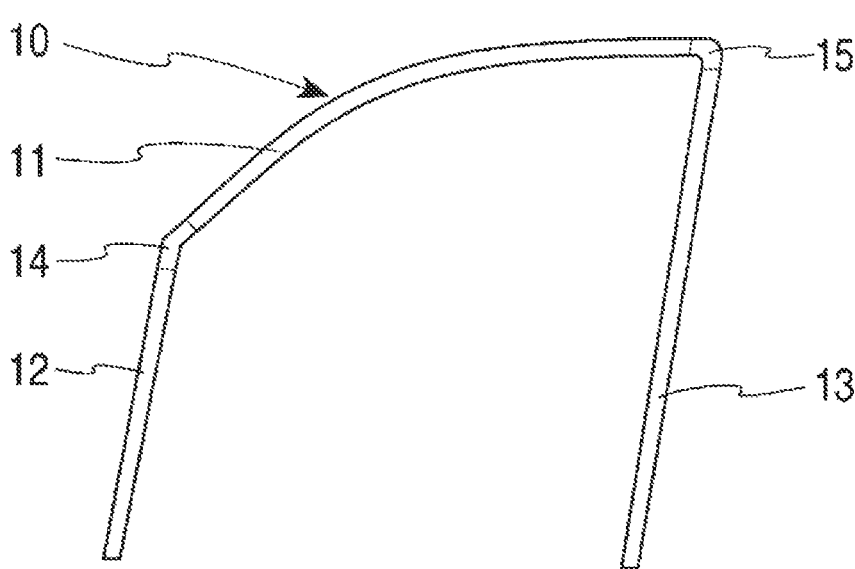
FIG. 2 is a front view illustrating a glass run used in a door frame of FIG. 1.

FIG. 2 is a simplified front view of only the glass run 10 as seen from the vehicle outer side. This glass run 10 includes a first extruded portion 11 corresponding to a lateral frame portion of the door frame 3, a second extruded portion 12 corresponding to a vertical frame portion on a front side of the front door 1, and a third extruded portion 13 corresponding to a vertical frame portion on a rear side. A front end portion of the first extruded portion 11 is connected to an upper end portion of the second extruded portion 12 by a first molded portion 14. A rear end portion of the first extruded portion 11 is connected to an upper end portion of the third extruded portion 13 by a second molded portion 15.

Figure 3A:
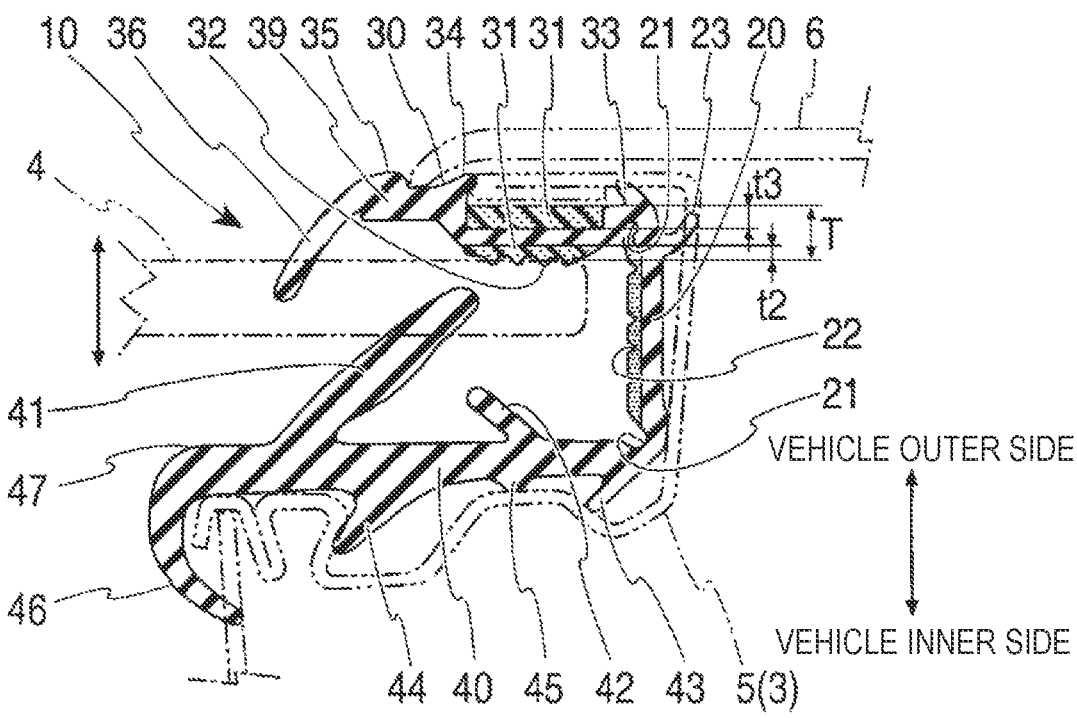
FIGS. 3A and 3B illustrate a glass run according to a first embodiment of the present disclosure, where
Figure 3B:
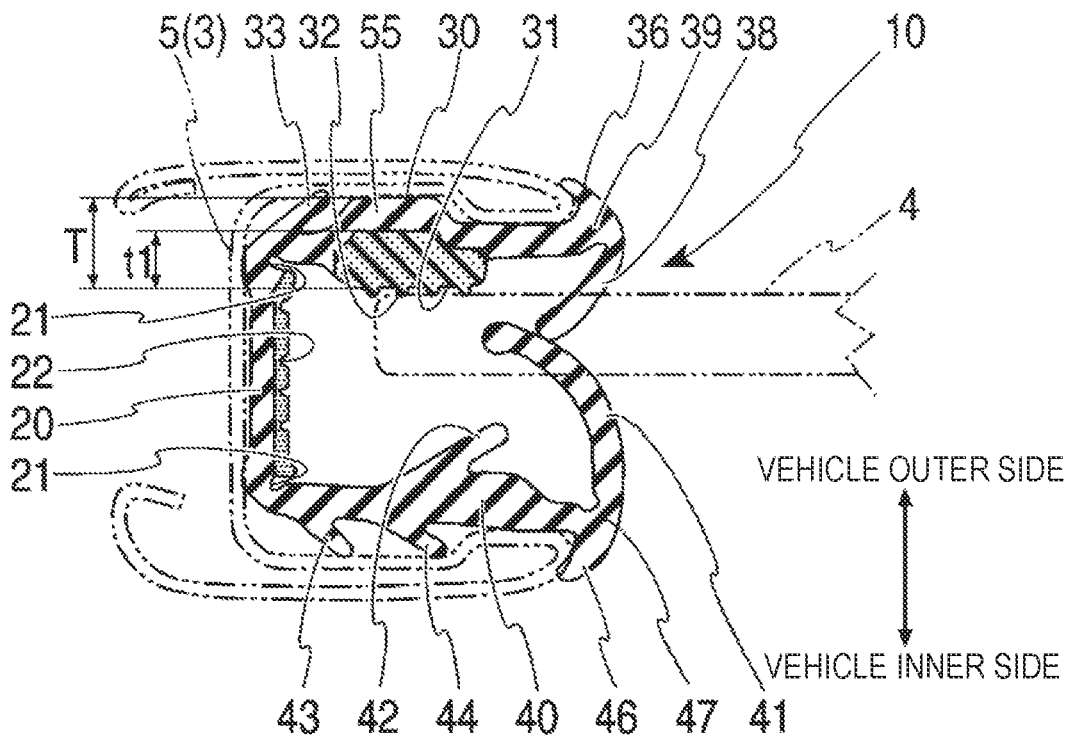

FIG. 3A is a cross-sectional view corresponding to the line X-X in FIG. 1, and FIG. 3B is a cross-sectional view corresponding to the line Y-Y in FIG. 1. The glass run 10 has a basic framework of a bottom wall 20, a vehicle-outer-side side wall 30, and a vehicle-inner-side side wall 40, and is formed in a channel shape (having a substantially U-shaped cross section). Connecting portions of the bottom wall 20, the vehicle-outer-side side wall 30, and the vehicle-inner-side side wall 40 are connected such that those can be expanded in a free state by groove portions 21 and 21 on the vehicle outer side and vehicle inner side.

The bottom wall 20 is formed in a substantially plate shape, and a plurality of bottom wall recess portions 22 are formed continuously in parallel in a longitudinal direction on an inner surface (door glass 4 side) of the bottom wall 20. Also, in FIG. 3A, a bottom wall seal lip 23 is formed on an outer surface of the bottom wall 20, and the bottom wall seal lip 23 abuts on a door frame groove portion 5 having a channel shape (substantially U-shaped cross section) and formed in the door frame 3 to seal between the bottom wall 20 and the door frame groove portion 5.

In FIG. 3A, on a vehicle outer side of the vehicle-outer-side side wall 30, a first vehicle-outer-side holding lip 33 and a second vehicle-outer-side holding lip 34 that are engaged with the door frame groove portion 5 are formed in a vicinity of the connecting portion with the bottom wall 20 and in a direction of a tip of the vehicle-outer-side side wall 30. The first vehicle-outer-side holding lip 33 and the second vehicle-outer-side holding lip 34 hold the door frame groove portion 5 formed by bending.

A cover lip 36 is formed on a vehicle-outer-side side wall tip portion 39 of the vehicle-outer-side side wall 30 toward the door glass 4 and a side opposite to the bottom wall 20. The cover lip 36 abuts on a vehicle-outer-side surface of the door glass 4 to prevent rainwater and dust from entering a thick portion 31 and prevent deterioration of the thick portion 31, which will be described below. Further, the sealing property with the door glass 4 is improved.

An engagement portion 35 is formed at a base of the cover lip 36 toward the vehicle outer side to fix an end portion of a pillar garnish 6 and seal a gap between the pillar garnish 6 and a surface of the door glass 4.

In FIG. 3B, a protrusion portion 55 is formed on a vehicle outer side of a middle portion of the vehicle-outer-side side wall 30. Also, on the vehicle-outer-side side wall 30, a vehicle-outer-side seal lip 38 is formed such that the vehicle-outer-side seal lip 38 extends from the vehicle-outer-side side wall tip portion 39 toward the vehicle inner side and toward the bottom wall 20, and a side surface on the vehicle inner side of the vehicle-outer-side seal lip 38 comes into sliding contact with the door glass 4. The vehicle-outer-side seal lip 38 does not abut on the thick portion 31, which will be described below.

A vehicle outer side of the protrusion portion 55 of the vehicle-outer-side side wall 30 in FIGS. 3A and 3B is in surface-contact with the door frame groove portion 5. The surface-contact can increase the rigidity of the vehicle-outer-side side wall 30 interposed between the door glass 4 and the door frame groove portion 5.

In FIG. 3A, on a vehicle outer side of the vehicle-inner-side side wall 40, a vehicle-inner-side seal lip 41 is formed such that the vehicle-inner-side seal lip 41 extends from a portion between a vehicle-inner-side side wall tip portion 47 and the bottom wall 20 toward the vehicle outer side and toward the bottom wall 20, and a side surface on the vehicle outer side of the vehicle-inner-side seal lip 41 comes into sliding contact with the door glass 4. The vehicle-inner-side seal lip 41 is designed such that regarding reaction forces received by the door glass 4 from the vehicle outer side and vehicle inner side when the door glass 4 is in sliding contact with the thick portion 31 of the vehicle-outer-side side wall 30 and the vehicle-inner-side seal lip 41, the force from the vehicle inner side is larger than the force from the vehicle outer side, and a pressing force on the door glass 4 toward the thick portion 31 increases.

A sub-lip 42 is formed on the vehicle outer side of the vehicle-inner-side side wall 40 and further on the bottom wall 20 side than the vehicle-inner-side seal lip 41 so as to extend in a direction opposite to that of the vehicle-inner-side seal lip 41. A tip portion of the sub-lip 42 abuts on the vehicle-inner-side side surface of the vehicle-inner-side seal lip 41, and supports the vehicle-inner-side seal lip 41 to press the vehicle inner side of the door glass 4 toward the vehicle outer side.

On the vehicle inner side of the vehicle-inner-side side wall 40, a first vehicle-inner-side holding lip 43 and a second vehicle-inner-side holding lip 44 are respectively formed in a vicinity of the connecting portion with the bottom wall 20 and in a direction toward a tip of the vehicle-inner-side side wall 40 so as to be engaged with curved parts of the door frame groove portion 5 having a curved portion. An abutment lip 45 is formed between the first vehicle-inner-side holding lip 43 and the second vehicle-inner-side holding lip 44. The vehicle-inner-side side wall 40 is held to the door frame groove portion 5 in a curved shape by the first vehicle-inner-side holding lip 43, the second vehicle-inner-side holding lip 44, and the abutment lip 45.

The vehicle-inner-side side wall tip portion 47 of the vehicle-inner-side side wall 40 is formed with a cover lip 46 directed toward the vehicle inner side. The cover lip 46 abuts on the door frame groove portion 5 to prevent rainwater, dust, and noise from entering and to improve the sealing property with the door frame groove portion 5.

On the other hand, in FIG. 3B, a first vehicle-inner-side holding lip 43 and a second vehicle-inner-side holding lip 44 that are engaged with curved parts of the door frame groove portion 5 are formed on the vehicle inner side of the vehicle-inner-side side wall 40. In addition, the vehicle-inner-side side wall tip portion 47 of the vehicle-inner-side side wall 40 is formed with a cover lip 46 directed toward the vehicle inner side, and the vehicle-inner-side side wall 40 is held to the door frame groove portion 5 in a curved shape by the first vehicle-inner-side holding lip 43, the second vehicle-inner-side holding lip 44, and the cover lip 46.

As illustrated in FIGS. 3A and 3B, the thick portion 31 that protrudes toward the vehicle inner side, is in sliding contact with the door glass 4, and has a higher hardness than that of the vehicle-outer-side side wall 30 is formed on the vehicle inner side of the vehicle-outer-side side wall 30. By bringing the door glass 4 into sliding contact with the thick portion 31 formed on the vehicle-outer-side side wall 30 and making the hardness of the thick portion 31 higher than that of the vehicle-outer-side side wall 30, a rigidity difference between the door glass 4 and the thick portion 31 becomes smaller. Therefore, impedance matching allows the vibration of the door glass 4 to flow efficiently into the thick portion 31 and dissipate, thereby reducing noise caused by wind noise.

A plurality of ribs 32 having convex shapes are formed continuously in parallel in the longitudinal direction on the vehicle-inner-side surface of the thick portion 31. The rib 32 prevents the thick portion 31 from being caught by dust, foreign matter, or the like when the door glass 4 is moved up and down, thereby preventing abnormal noise from occurring.

Figure 8:
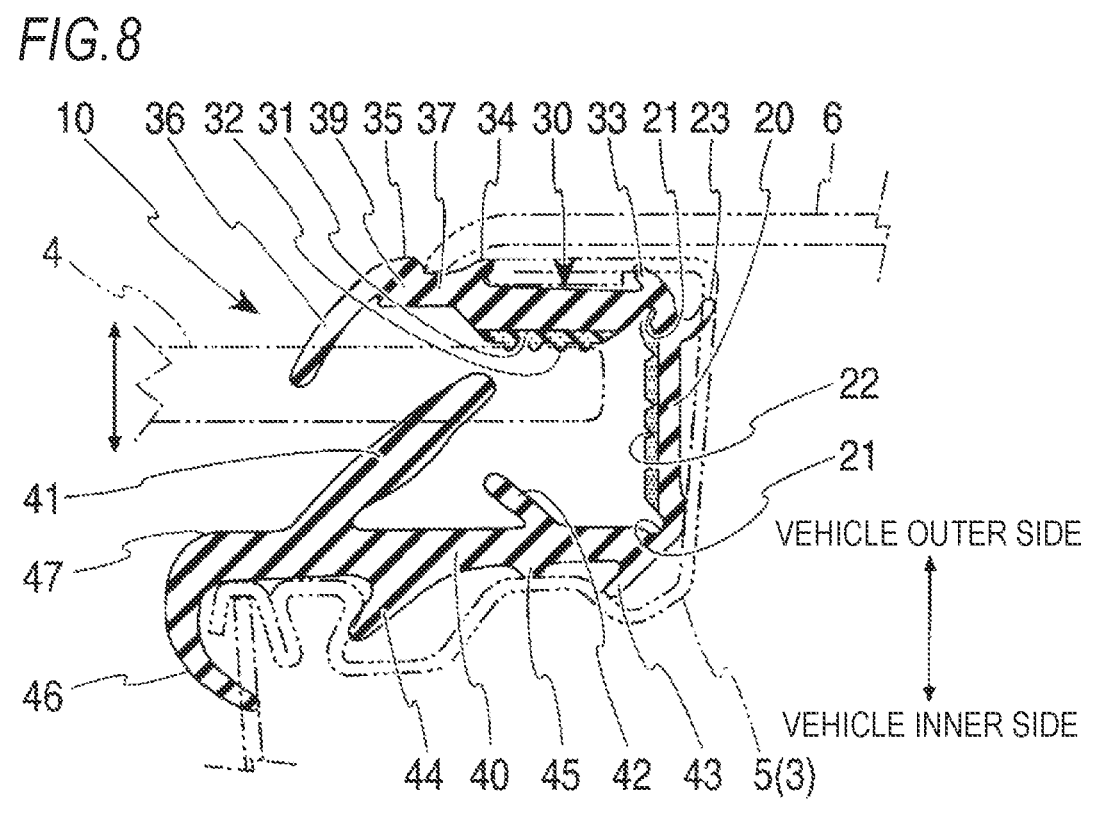

The first embodiment forms the thick portion 31 thicker than the thick portion 31 in FIG. 8. In the first embodiment, when a thickness of the thick portion 31 is set to t1 and the sum of the thicknesses of the thick portion 31 and the vehicle-outer-side side wall 30 is set to T, a relationship of t1=0.7T is satisfied.

By forming the thick portion 31 thick, the rigidity of the glass run 10 can be increased. Therefore, even when the rib 32 having a convex shape is formed on the vehicle inner side of the thick portion 31, the effect of the thick portion 31 is sufficiently exhibited, and thus the reduction effect against noise caused by wind noise can be increased.

From a viewpoint of increasing the rigidity of the vehicle-outer-side side wall 30 of the glass run 10, the thickness t1 of the thick portion 31 is preferably 0.4T or more. Further, when the thickness t1 of the thick portion 31 is less than 1.0T, the thick portion 31 may be formed as a single mass, or may be formed by dividing the thick portion 31 into a part that is in sliding contact with the door glass 4 and a part that is in the vehicle-outer-side side wall 30. When the thick portion 31 dividedly formed in the vehicle-outer-side side wall 30, for example, it may be embedded in the vehicle-outer-side side wall 30 or formed to be exposed to the vehicle outer side of the vehicle-outer-side side wall 30, or may include both of the cases described above.

Here, FIG. 3B illustrates a form in which the thick portion 31 is formed as single mass and the thickness t1 of the thick portion 31 is set to t1=0.7T. On the other hand, FIG. 3A illustrates a form in which the thick portion 31 is formed by dividing it into a part that is in sliding contact with the door glass 4 and a part that is exposed to the vehicle outer side of the vehicle-outer-side side wall 30, and the thickness of the thick portion 31 on the door glass 4 side is set to t2, the thickness of the thick portion 31 exposed to the vehicle outer side is set to t3, the sum of those thicknesses is set to the thickness t1 of the thick portion 31, that is, t1=t2+t3, and a relationship of t1=0.7T is satisfied. Although t2<t3 is depicted in FIG. 3A, t2≥t3 may be satisfied.

In the present embodiment, the glass run 10 excluding the thick portion 31 is produced by extrusion molding (co-extrusion molding) using olefinic thermoplastic elastomer (TPO) with an IRHD (international rubber hardness) of 80±5, and the thick portion 31 is produced by extrusion molding (co-extrusion molding) using TPO with an IRHD of 100±5. In addition, when the thick portion 31 is formed in a dividing manner as illustrated in FIG. 3A, since the thick portion 31 on the vehicle outer side (portion of t3) is not in contact with the door glass 4, TPO with an IRHD from 85 to 105 may be used and the thick portion 31 on the vehicle outer side may be different from the thick portion 31 on the vehicle inner side (portion of t2).

Further, in the embodiment of the present disclosure, the glass run 10 can be made of rubber, thermoplastic elastomer, soft synthetic resin, or the like, in addition to olefinic thermoplastic elastomer (TPO). In the case of rubber, ethylene propylene diene rubber (EPDM) is preferable, and in the case of thermoplastic elastomer, dynamic cross-linking thermoplastic elastomer (TPV) is preferable from viewpoints of weather resistance, recycling, cost, and the like.

Figure 4A:
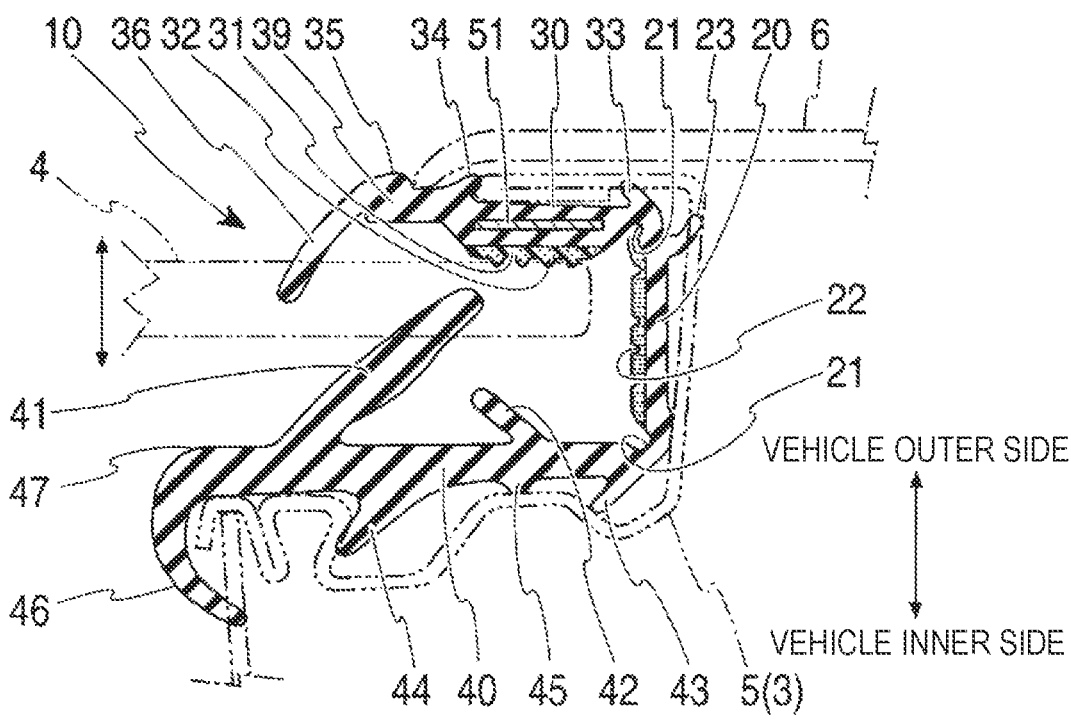
FIGS. 4A and 4B illustrate a glass run according to a second embodiment of the present disclosure, where
Figure 4B:
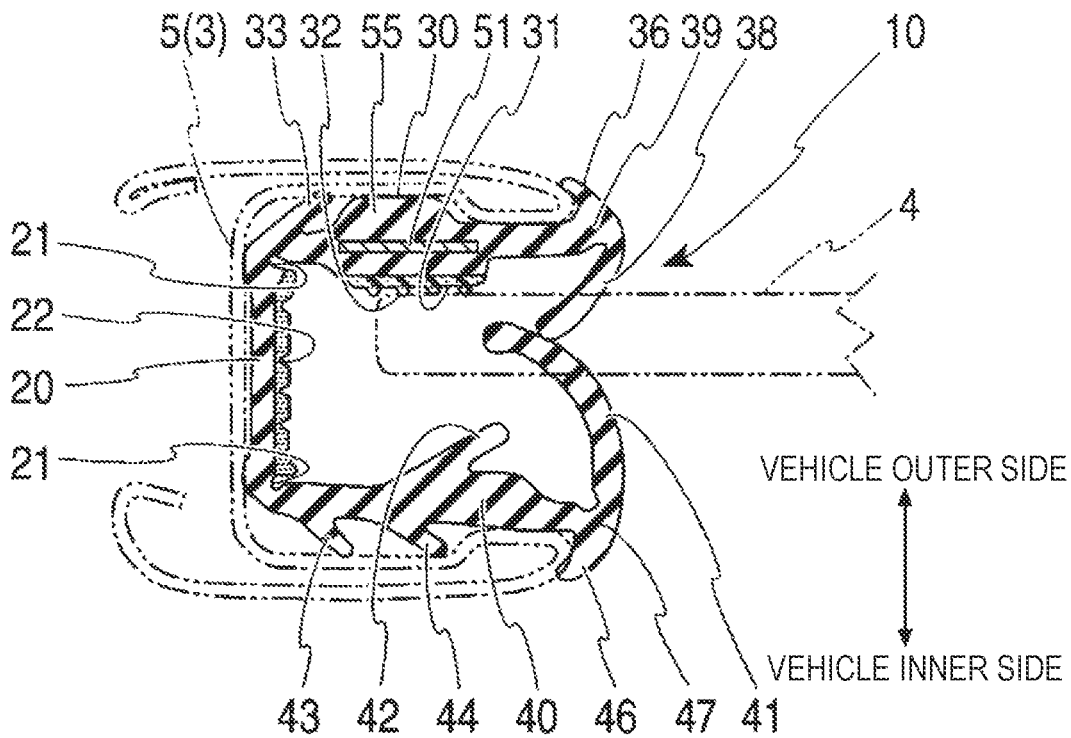

Next, a second embodiment of the present disclosure will be described with reference to FIGS. 4A and 4B. In the second embodiment, a difference from the first embodiment described above is that in the second embodiment, the thickness of the thick portion 31 is the same as in FIG. 8, but an insert 51 is embedded in the vehicle-outer-side side wall 30 on the vehicle outer side of the thick portion 31.

In the second embodiment, a cold-rolled steel plate (SPCC) with a thickness of 0.5 mm is used as the insert 51. When the insert 51 is embedded in the vehicle-outer-side side wall 30 of the glass run 10, the thickness of the insert 51 is preferably set to 0.5 mm to 1.0 mm. Further, the material is not limited to SPCC, and other metal materials such as aluminum and stainless steel may be used. The metal plate may be a metal mesh or punching metal in which holes are formed in a metal plate. The insert 51 is extruded (co-extruded) together with the glass run 10.

By embedding the insert 51 made of a metal plate in the vehicle-outer-side side wall 30 on the vehicle outer side of the thick portion 31, the rigidity of the glass run 10 can be increased. Therefore, even when the rib 32 having a convex shape is formed on the vehicle inner side of the thick portion 31, the effect of the thick portion 31 is sufficiently exhibited, and thus the reduction effect against noise caused by wind noise can be increased.

Figure 5A:
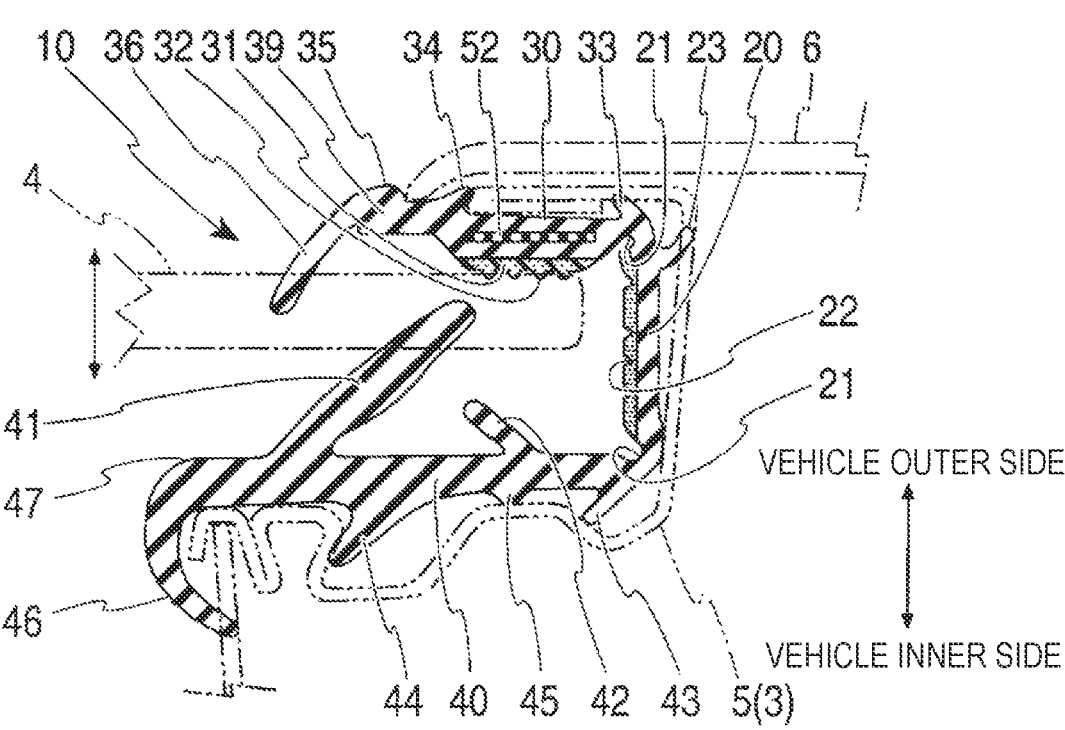
FIGS. 5A and 5B illustrate a glass run according to a third embodiment of the present disclosure, where
Figure 5B:
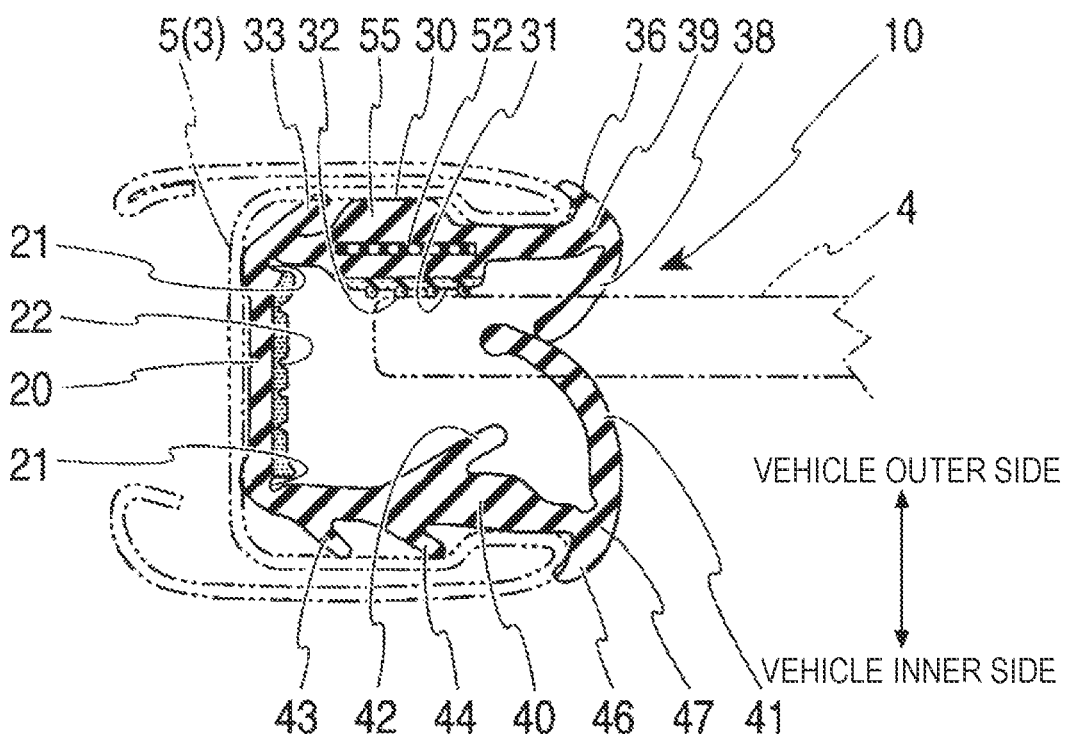

Next, a third embodiment of the present disclosure will be described with reference to FIGS. 5A and 5B. The third embodiment is a modification example of the second embodiment, and shows the case where a wire carrier 52 is embedded. As described above, a wire carrier is a long thin plate-shaped piece formed by bending a thin wire as a core material in a zigzag pattern at a constant width and holding it with a plurality of threads in the longitudinal direction. In the third embodiment, an iron material with a diameter of 0.5 mm is used as the core material. In addition, polyethylene terephthalate (PET), which is a non-heat-melting thread, is used as the thread that holds the core material and suppresses elongation in the longitudinal direction.

The core material is not limited to iron material, and may be other metals, and the diameter of the core material is not limited to 0.5 mm. However, from a viewpoint of increasing the rigidity of the vehicle-outer-side side wall 30 of the glass run 10, the diameter is preferably 0.5 mm to 1.0 mm.

In addition, the thread that holds the core material and suppresses elongation in the longitudinal direction is not limited to PET, which is a non-heat-melting thread, and for example, when rubber EPDM is used for the glass run 10, hot-melt threads that melt in a vulcanizing furnace may be used.

By embedding the wire carrier 52 in the vehicle-outer-side side wall 30 on the vehicle outer side of the thick portion 31, the rigidity of the glass run 10 can be increased. Therefore, even when the rib 32 having a convex shape is formed on the vehicle inner side of the thick portion 31, the effect of the thick portion 31 is sufficiently exhibited, and thus the reduction effect against noise caused by wind noise can be increased.

Figure 6A:
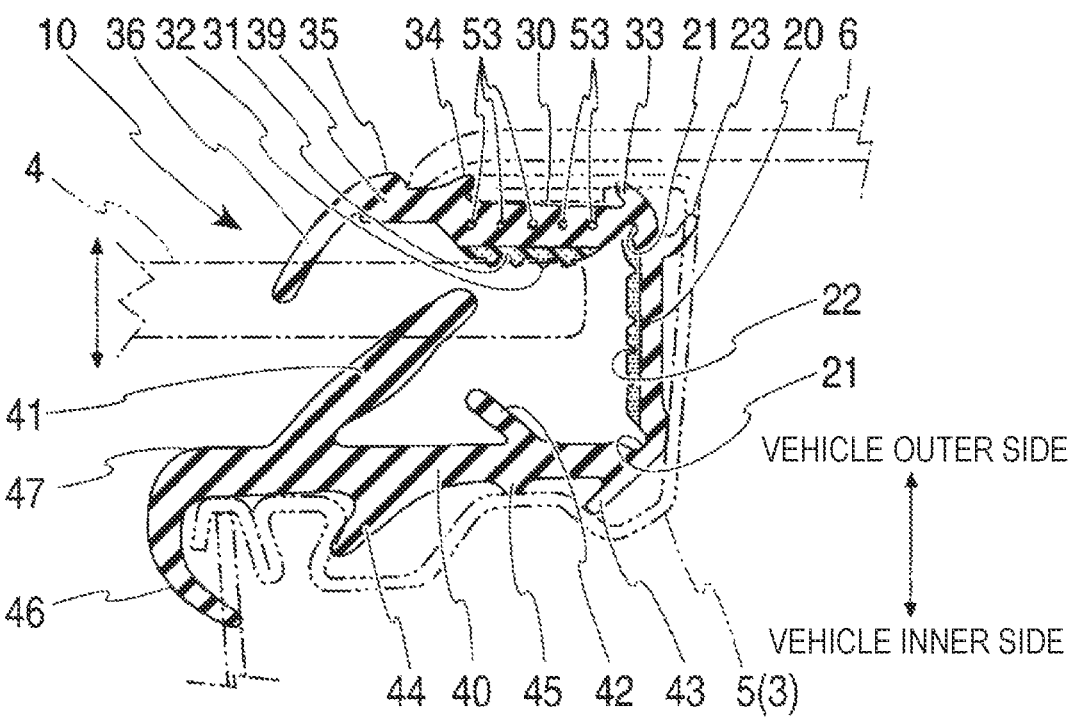
FIGS. 6A and 6B illustrate a glass run according to a fourth embodiment of the present disclosure, where
Figure 6B:
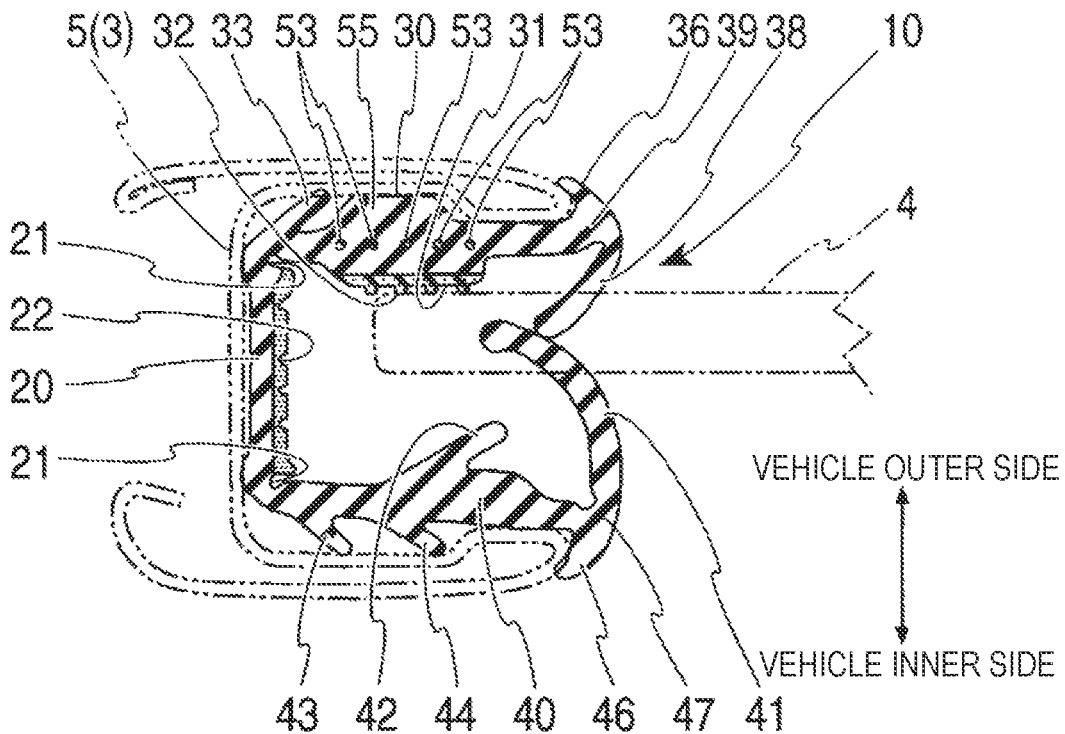

Next, a fourth embodiment of the present disclosure will be described with reference to FIGS. 6A and 6B. The fourth embodiment is a modification example of the second embodiment, in which five wire core materials 53 are embedded. Five iron materials with a diameter of 0.5 mm are used as core materials. The wire core material 53 is not limited to an iron material, and may be other metals, and the diameter thereof is not limited to 0.5 mm. However, from a viewpoint of increasing the rigidity of the vehicle-outer-side side wall 30 of the glass run 10, the wire core material 53 preferably has a diameter of 0.5 mm to 1.0 mm. Also, the number of wire core materials to be embedded is not limited to five, but it is preferable to embed a plurality of wire core materials from the viewpoint of increasing rigidity.

By embedding the wire core material 53 in the vehicle-outer-side side wall 30 on the vehicle outer side of the thick portion 31, the rigidity of the vehicle-outer-side side wall 30 of the glass run 10 can be increased. Even when the rib 32 having a convex shape is formed on the vehicle inner side of the thick portion 31, the effect of the thick portion 31 is sufficiently exhibited, and thus the reduction effect against noise caused by wind noise can be increased.

Figure 7A:
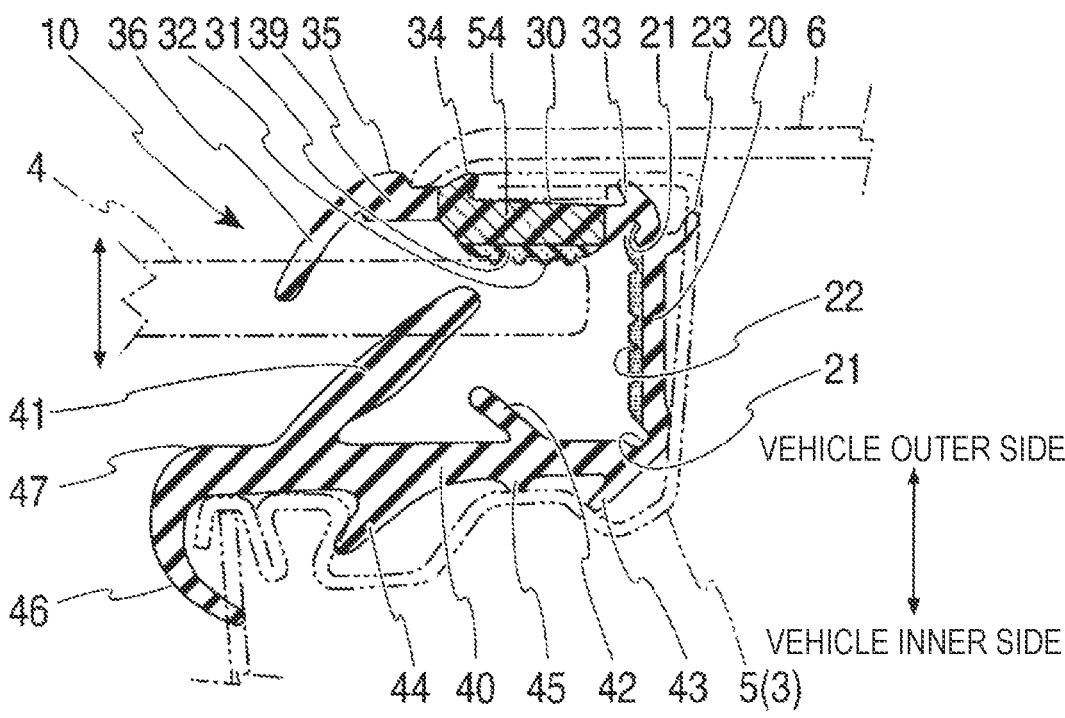
FIGS. 7A and 7B illustrate a glass run according to a fifth embodiment of the present disclosure, where
Figure 7B:
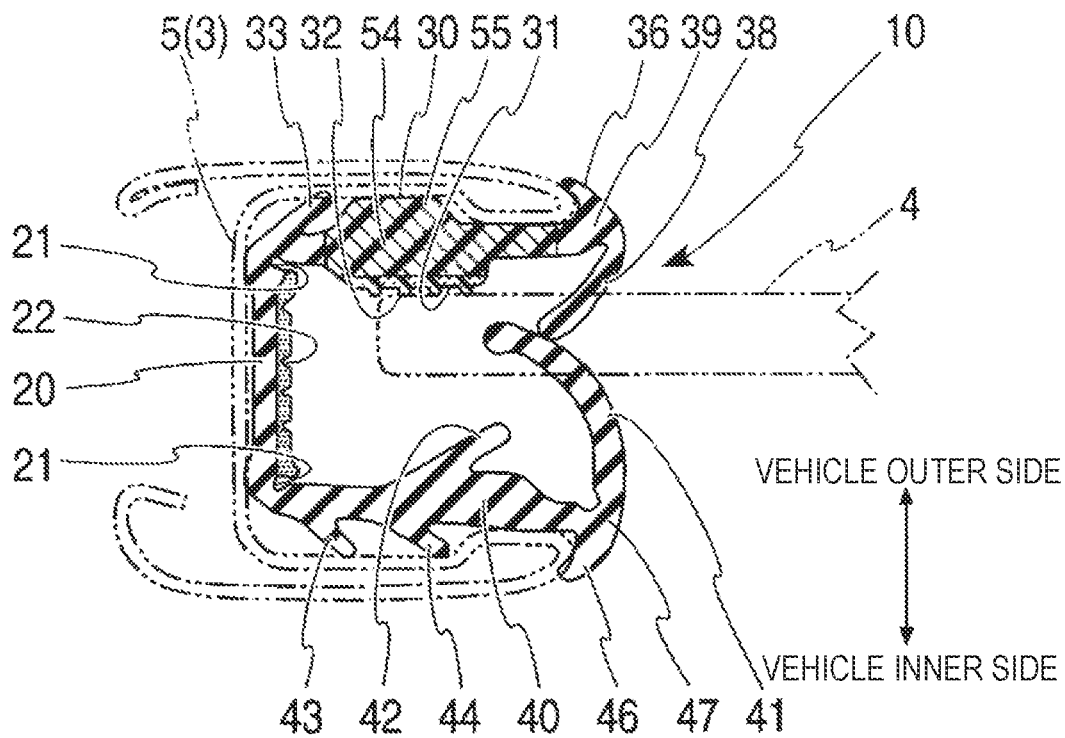

Next, a fifth embodiment of the present disclosure will be described with reference to FIGS. 7A and 7B. In the fifth embodiment, in the vehicle-outer-side side wall 30, a semi-rigid material portion 54 made of a semi-rigid material of the vehicle-outer-side side wall 30 is formed in a portion connected to the thick portion 31, and a hardness of the semi-rigid material portion 54 is less than that of the thick portion 31 and greater than that of the vehicle-outer-side side wall 30 other than the semi-rigid material portion 54. The semi-rigid material portion 54 is formed through the vehicle-outer-side side wall 30 and in surface-contact with the door frame groove portion 5.

In the present embodiment, the thick portion 31 is produced by extrusion molding using TPO with an RHD (International Rubber Hardness) of 100±5. In the vehicle-outer-side side wall 30, the portion where the semi-rigid material portion 54 is formed is produced by extrusion molding using TPO with an RHD of 90±5, and other portions of the glass run 10 are produced by extrusion molding using olefinic thermoplastic elastomer (TPO) with an IRHD of 80±5.

In the vehicle-outer-side side wall 30, since the semi-rigid material portion 54 made of a semi-rigid material is formed in a portion connected to the thick portion 31, the rigidity of the glass run 10 can be increased. Even when the rib 32 having a convex shape is formed on the vehicle inner side of the thick portion 31, the effect of the thick portion 31 is sufficiently exhibited, and thus the reduction effect against noise caused by wind noise can be increased.

The implementation of the present disclosure is not limited to the embodiments described above, and various modifications are possible without departing from the object of the present disclosure.

For example, in the first to fifth embodiments described above, in order to increase the rigidity of the vehicle-outer-side side wall 30 at a portion where the thick portion 31 is formed, an insert or the like is embedded mainly on the vehicle outer side of the thick portion 31 to thicken the thick portion 31, or the semi-rigid material portion 54 is formed. However, the insert, the semi-rigid material portion 54, or the like may be arranged and formed over a wide range of the vehicle-outer-side side wall 30 as well as the vehicle outer side connected to the thick portion 31. In this case, considering the ease of assembly of the glass run 10 to the door frame groove portion 5 of the door frame 3, they can be arranged and formed in an area except for the groove portion 21 on the vehicle outer side, which is the connecting portion between the bottom wall 20 and the vehicle-outer-side side wall 30.

For example, the glass run 10 of the embodiments of FIGS. 3B, 4B, 5B, 6B, and 7B described above can be applied to the first extruded portion 11 in FIG. 2.

In the first to fifth embodiments described above, the case where the plurality of ribs 32 having convex shapes are formed on the vehicle-inner-side surface of the thick portion 31 is described, but the present disclosure can also be applied to a thick portion that does not have a rib 32 having a convex shape.

What is claimed is:

1. A glass run comprising:
a bottom wall;
a vehicle-outer-side side wall; and
a vehicle-inner-side side wall, wherein:
    the bottom wall, the vehicle-outer-side side wall and the vehicle-inner-side side wall configure a basic framework being attached to a door frame groove portion formed in a door frame;
the glass run guides an up and down movement of a door glass;
a thick portion that protrudes to a vehicle inner side and is in sliding contact with the door glass is formed on a vehicle inner side of the vehicle-outer-side side wall; and
a semi-rigid material portion made of a semi-rigid material is formed in a portion of the vehicle-outer-side side wall that connects with the thick portion, and a hardness of the semi-rigid material portion is less than that of the thick portion and greater than that of the vehicle-outer-side side wall other than the semi-rigid material portion.

2. A glass run comprising:
a bottom wall;
a vehicle-outer-side side wall; and
a vehicle-inner-side side wall, wherein:
    the bottom wall, the vehicle-outer-side side wall and the vehicle-inner-side side wall configure a basic framework being attached to a door frame;
the glass run guides an up and down movement of a door glass;
a rigid portion being in sliding contact with the door glass is formed on a vehicle inner side of the vehicle-outer-side side wall; and
a semi-rigid material portion made of a semi-rigid material is formed in a portion of the vehicle-outer-side side wall that connects with the rigid portion, and a hardness of the semi-rigid material portion is less than that of the rigid portion and greater than that of the vehicle-outer-side side wall other than the semi-rigid material portion.

3. A glass run comprising:
a bottom wall;
a vehicle-outer-side side wall; and
a vehicle-inner-side side wall, wherein:
    the bottom wall, the vehicle-outer-side side wall and the vehicle-inner-side side wall configure a basic framework being attached to a door frame;
the glass run guides an up and down movement of a door glass;
a rigid portion being in sliding contact with the door glass is formed on a vehicle inner side of the vehicle-outer-side side wall, and a hardness of the rigid portion is greater than that of the vehicle-outer-side side wall; and
the rigid portion is formed to be divided into a part being in sliding contact with the door glass and a part located in the vehicle-outer-side side wall.

4. The glass run according to claim 3, wherein
the rigid portion formed in the vehicle-outer-side side wall is formed such that the rigid portion is exposed to a vehicle outer side of the vehicle-outer-side side wall.

5. The glass run according to claim 3, wherein
a rib having a convex shape is formed on a vehicle-inner-side surface of the rigid portion.

6. The glass run according to claim 3, wherein
the rigid portion being exposed to a vehicle outer side of the vehicle-outer-side side wall is in surface-contact with the door frame.

7. The glass run according to claim 3, wherein
the rigid portion being exposed to a vehicle outer side of the vehicle-outer-side side wall is formed as a protrusion portion.

8. The glass run according to claim 3, wherein
when a thickness of the rigid portion is set to t1, a sum of thicknesses of the rigid portion and the vehicle-outer-side side wall is set to T, a thickness of the part being in sliding contact with the door glass of the rigid portion is set to t2, and a thickness of the part located in the vehicle-outer-side side wall of the rigid portion is set to t3, $$t2+t3=t1,\text{ and}$$

t1 is 0.4T or more and 1.0T or less.

* * * * *